(12) United States Patent
Nakatani (10) Patent No.: US 7,760,602 B2
(45) Date of Patent: *Jul. 20, 2010

(54) HYBRID TYPE OPTICAL DISC AND MANUFACTURING METHOD FOR HYBRID TYPE OPTICAL DISC

(75) Inventor: Morio Nakatani, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 681 days.

This patent is subject to a terminal disclaimer.

(21) Appl. No.: 11/445,344

(22) Filed: Jun. 2, 2006

(65) Prior Publication Data

US 2006/0275713 A1   Dec. 7, 2006

(30) Foreign Application Priority Data

Jun. 3, 2005  (JP) .............................. 2005-164462

(51) Int. Cl.
   *G11B 19/02*  (2006.01)
(52) U.S. Cl. ..................... 369/53.21; 369/94
(58) Field of Classification Search ............... 369/53.21
   See application file for complete search history.

(56) References Cited

U.S. PATENT DOCUMENTS 5,883,877 A * 3/1999 Nishizawa ............... 369/275.1

7,609,598 B2 * 10/2009 Nakatani ................. 369/53.21
2003/0185128 A1 * 10/2003 Shoji et al. ............... 369/59.25
2005/0198115 A1 * 9/2005 Sugimoto et al. .......... 709/203

FOREIGN PATENT DOCUMENTS

JP       2002216391 A *  8/2002
JP       2004-185724 A   7/2004

OTHER PUBLICATIONS

Machine translation of JP 2002-216391 A into English, Suzuki.*

* cited by examiner

*Primary Examiner*—Wayne R Young
*Assistant Examiner*—Brian Butcher
(74) *Attorney, Agent, or Firm*—McDermott Will & Emery LLP (57) ABSTRACT

A stamper which has a region information according to a destination is set to the resin molding machine for HDDVD and the resin molding machine for DVD, respectively. The contents information (contents A) of the same program is held in each stamper. The region information of each stamper is different according to the destination of contents information. Two disc substrates to which the information on each stamper is transferred are formed using the resin molding machine for HDDVD and the resin molding machine for DVD, and the reflecting layer is further formed on the transfer face of each substrate by sputtering. And as the reflecting layer side faces each other, each disc substrate is laminated. Thereby, hybrid type next-generation DVD from which the destination of the contents information of a HDDVD layer and a DVD layer is different is manufactured.

16 Claims, 5 Drawing Sheets

*FIG. 4B* REPRODUCTION BY HDDVD PLAYER

*FIG. 4A* REPRODUCTION BY DVD PLAYER

FIG.5 REPRODUCTION BY HDDVD/DVD COMPATIBILITY TYPE PLAYER

HYBRID TYPE OPTICAL DISC AND MANUFACTURING METHOD FOR HYBRID TYPE OPTICAL DISC

This application claims priority under 35 U.S.C. Section 119 of Japanese Patent Application No. 2005-164462 filed Jun. 3, 2005.

BACKGROUND OF THE INVENTION

1. Field of the Invention

The present invention relates to a hybrid type optical disc with two or more recording layers in the laminating direction corresponding to laser beams of different wavelengths, and a manufacturing method for the same.

2. Description of the Related Art

Presently, reproduction type DVD (Digital Versatile Disc) using a red laser beam with a wavelength of about 650 nm is commercialized, and it has spread widely. The region information for specifying the area where reproduction of the DVD is permitted can be made to hold to the DVD. The region information is prepared from the first by the request from a film maker. That is, even if DVD which has theater unpublished contents in a country circulates in the country since the theater public presentation timing of a movie is different for every country, in order to be unable to reproduce the DVD in the country, the propriety of reproduction of DVD is managed by the region information for every area.

Only when the region code is consistent with the region information of DVD loaded to the player, the DVD can be reproduced in the player. Generally, in a consumer type DVD player, only one region code is held to one format.

JP 2004-185724 A describes that when a player moves to other areas from the area corresponding to a region code, DVD holding the region information which specifies the area after movement can be reproduced by equipping a player with a desorbed type local data retaining means.

Recently, standardization of next-generation DVD using a blue laser beam with a wavelength of about 405 nm is advanced. In this standardization, consideration is made on arranging two recording layers, the recording layer (hereinafter referred to as "HDDVD layer") corresponding to a blue laser beam and the recording layer (hereinafter referred to as "DVD layer") corresponding to a red laser beam, in a laminating direction. The recording layer of three or more layers may be arranged in one disc. Data is recorded on a HDDVD layer and a DVD layer in the format in accordance with a next-generation DVD standard and a DVD standard, respectively.

When next-generation DVD is commercialized, the spread speed of it is usually different for every country. It is assumed that even if next-generation DVD is gradually spreading all over the world from now on, the spread state of the player to reproduce next-generation DVD is not enough for some countries. In this case, contents are circulated mainly with the DVD to these countries. Therefore, according to the spread state of player for each country, the disc manufacturer must prepare two kinds of discs, DVD and next-generation DVD, about the same contents. In this case, the disc manufacturer needs to prepare two kinds of stock, DVD and next-generation DVD. Also the disc manufacturer must prepare two production lines and must control the operation state of each line suitably.

In addition, the intention of a contents holder is also assumed from a viewpoint of protection of copyrights such that high quality contents, such as HD (High Definition) picture, are not supplied to an area where protection of copyrights is indefinite and only the contents of SD (Standard Definition) picture are supplied to the area. In this case, it is necessary to enable it to carve a quality level of the contents and to set up the destination of contents flexibly according to the intention of a contents holder.

SUMMARY OF THE INVENTION

The present invention is made in order to solve such a problem and to fulfill such necessity, and an object of the present invention is to enable it to provide contents corresponding to the spread state of a player in each country and the intention of a contents holder with one production line.

A first aspect of the present invention is, characterized by a hybrid type optical disc comprising; a first recording layer corresponding to a laser beam of a first wavelength; and a second recording layer corresponding to a laser beam of a second wavelength different from the first wavelength; wherein a first contents information and a first region information for specifying an area in which reproduction of the first contents information is permitted are recorded in the first recording layer in a format applied to the first recording layer; a second contents information and a second region information for specifying an area in which reproduction of the second contents information is permitted are recorded in the second recording layer in a format applied to the second recording layer; and the first region information differs from the second region information mutually according to a destination of the first contents information and the second contents information.

A second aspect of the present invention is characterized by a hybrid type optical disc comprising; a next generation DVD layer; and a DVD layer; wherein a first contents information and a first region information for specifying an area in which reproduction of the first contents information is permitted are recorded in the next generation DVD layer in a format applied to the next generation DVD layer; a second contents information and a second region information for specifying an area in which reproduction of the second contents information is permitted are recorded in the DVD layer in a format applied to the DVD layer; and the first region information differs from the second region information mutually according to a destination of the first contents information and the second contents information.

A third aspect of the present invention is characterized by a manufacturing method of a hybrid type optical disc, comprising; a first recording layer formation step for forming a first recording layer corresponding to a laser beam of a first wavelength using a resin molding machine, and a second recording layer formation step for forming a second recording layer corresponding to a laser beam of a second wavelength different from the first wavelength using a resin molding machine, wherein the first recording layer formation step includes a step for performing a resin molding using a first stamper which holds a first contents information and a first region information for specifying an area in which reproduction of the first contents information permitted in a format applied to the first recording layer, the second recording layer formation step includes a step for performing a resin molding using a second stamper which holds a second contents information and a second region information for specifying an area in which reproduction of the second contents information permitted in a format applied to the second recording layer, a stamper according to a destination of the first contents information is chosen from a group of stampers from which a region information is mutually different as the first stamper used in the first recording layer formation step, and a stamper according to a destination of the second contents information is chosen from a group of stampers from which a region information is mutually different as the second stamper used in the second recording layer formation step.

A fourth aspect of the present invention is characterized by A manufacturing method of a hybrid type optical disc, comprising; a first recording layer formation step for forming a next generation DVD layer using a resin molding machine, and a second recording layer formation step for forming a DVD layer using a resin molding machine, wherein the first recording layer formation step includes a step for performing a resin molding using a first stamper which holds a first contents information and a first region information for specifying an area in which reproduction of the first contents information permitted in a format applied to the next generation DVD layer, the second recording layer formation step includes a step for performing a resin molding using a second stamper which holds a second contents information and a second region information for specifying an area in which reproduction of the second contents information permitted in a format applied to the DVD layer, a stamper according to a destination of the first contents information is chosen from a group of stampers from which a region information is mutually different as the first stamper used in the first recording layer formation step, and a stamper according to a destination of the second contents information is chosen from a group of stampers from which a region information is mutually different as the second stamper used in the second recording layer formation step.

According to the present invention, the destination of contents held at each recording layer can carve by a region information. That is, the contents corresponding to two or more destinations are held in one hybrid type optical disc. For this reason, the disc manufacturer just needs to manufacture one kind of disc to two or more destinations. The manufactured disc is provided towards the destination of contents according to demand.

Thus, according to the present invention, it is not necessary to prepare two kinds of stock, DVD and next-generation DVD. Also, According to the present invention, it is not necessary to prepare two production lines for DVD and for next-generation DVD, and the time and effort to control the operation state of each line is not needed, either. According to the present invention, the disc manufacturing control cost and facility cost of a disc manufacturer can be reduced effectively. According to the present invention, the quality levels and the destinations of contents can be set up flexibly according to the intention of a contents holder.

BRIEF DESCRIPTION OF THE DRAWINGS

The above-mentioned and other objects of the present invention and the novel features thereof will be completely more clear when the following description of the embodiment is read with reference to the accompanying drawings, in which.

DESCRIPTION OF THE PREFERRED EMBODIMENTS

The embodiments of the present invention will now be described with reference to the drawings.

Figure 1:
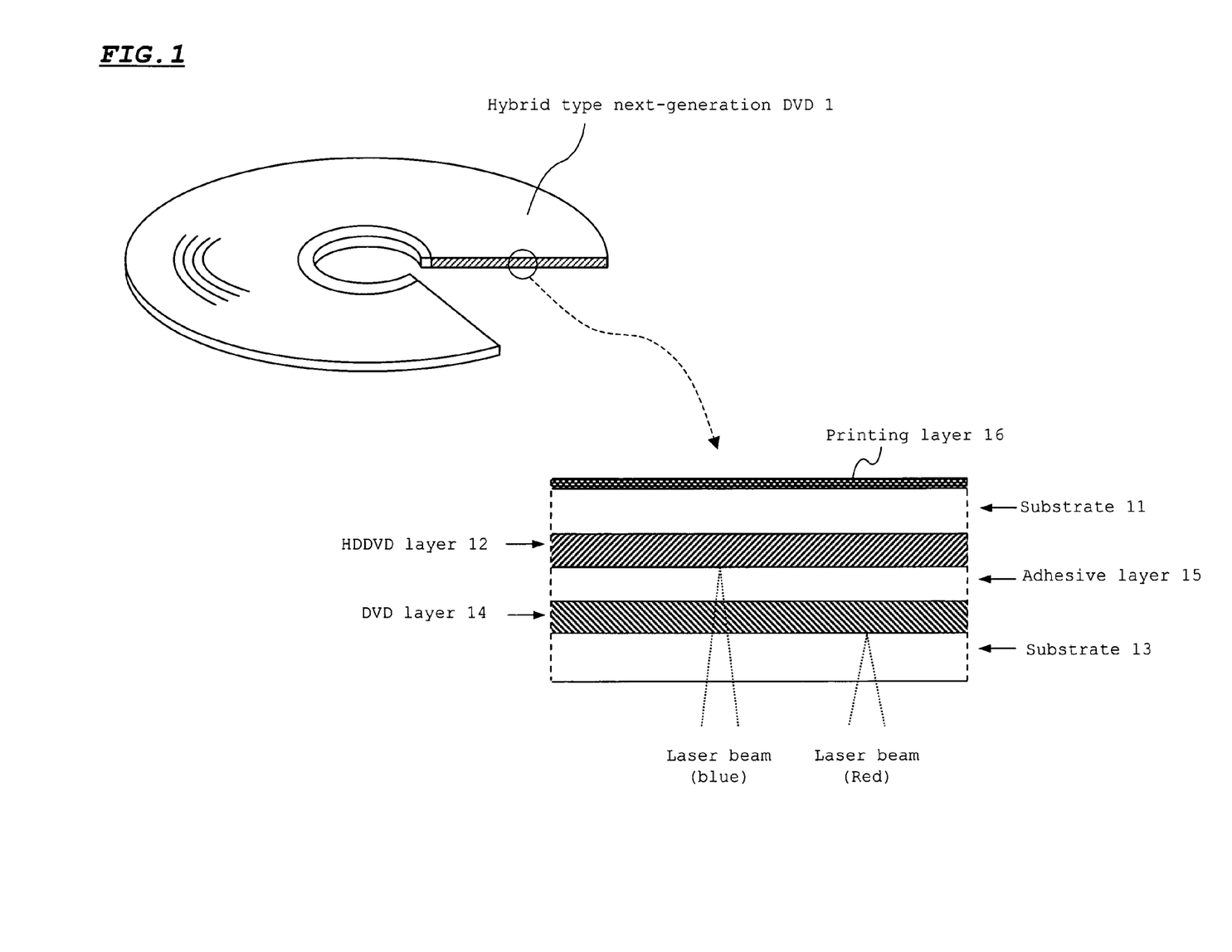
FIG. 1 shows a configuration of an optical disc according to the embodiment of the present invention.

FIG. 1 shows a configuration of the hybrid HDDVD (reproduction-only type).

The hybrid type next-generation DVD 1 has a configuration in which a substrate 11 formed with the HDDVD layer (first recording layer) 12 on one surface and a substrate 13 formed with the DVD layer (second recording layer) 14 on one surface are laminated by an adhesive layer 15, and a printing layer 16 is formed on the other surface of the substrate 11. The laser light enters from the substrate 13 side. A series of pits are spirally formed in the HDDVD layer 12 and the DVD layer 14.

The data format of the DVD layer 14 is the same as the data format of the existing DVD. Information indicating the presence of the HDDVD layer 12 is not contained in the lead-in information of the DVD layer 14. The DVD layer 14 transmits and reflects the blue laser light having a wavelength of about 405 nm and a red laser light having a wavelength of about 655 nm, respectively, at a defined ratio.

The data format complying with the next generation DVD standard is applied to the HDDVD layer 12. Information indicating the presence of the DVD layer 14 is also not contained in the lead-in information of the HDDVD layer 12. The HDDVD layer 14 is formed by a material that reflects the blue laser light at a defined reflectance, but substantially transmits all the red laser lights. Thus, the HDDVD layer 12 is not optically detected by the existing DVD player.

Figure 2:
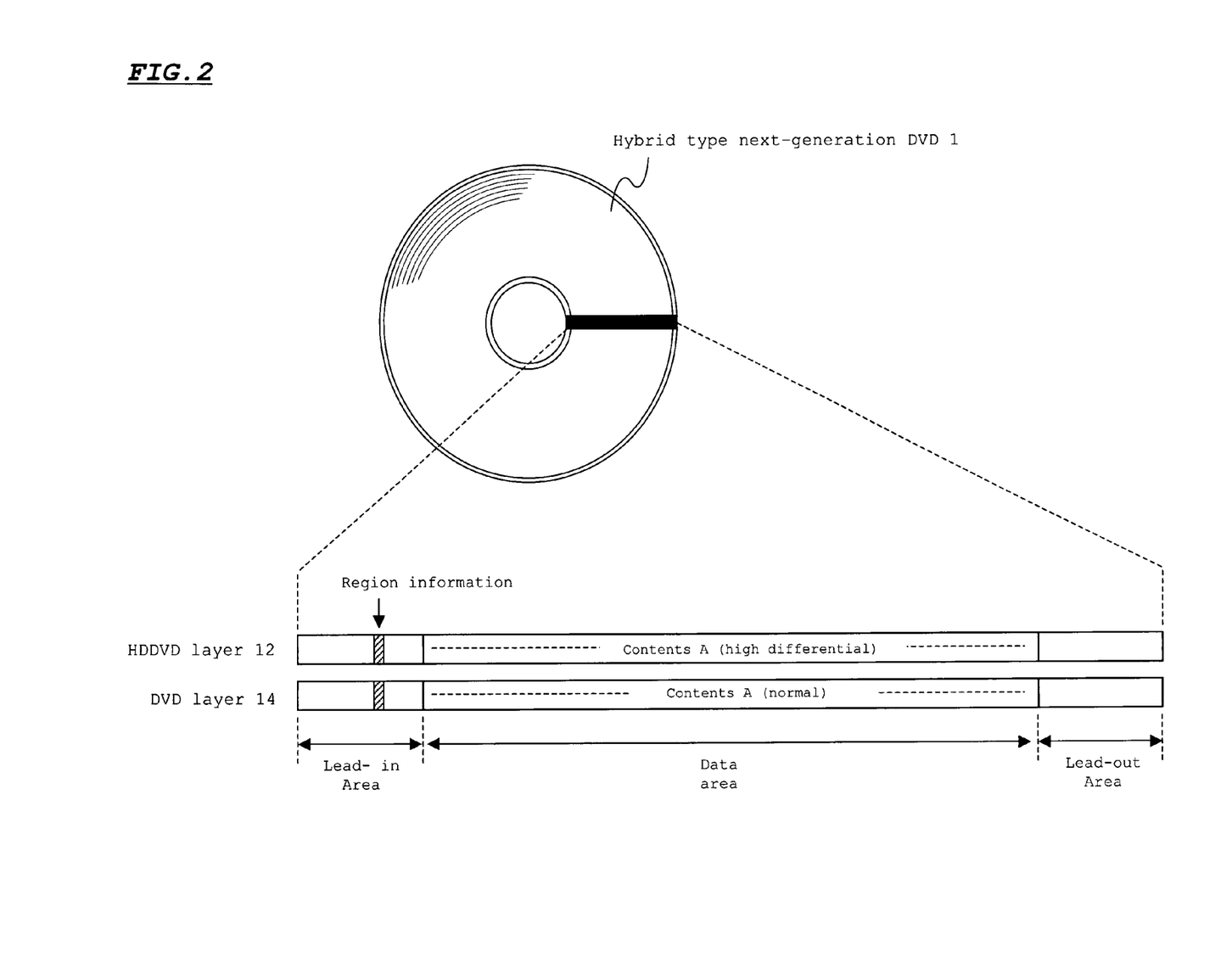
FIG. 2 shows an area format of the optical disc according to the embodiment of the present invention.

FIG. 2 shows an area format of the hybrid HDDVD.

As shown in FIG. 2, the HDDVD layer 12 and the DVD layer 14 are divided into a lead-in area, a data area, and lead-out area sequentially from the disc inner circumference side, respectively. Among these, a region information is held as one of the control information in the lead-in area. As described above, the region information is information for specifying the area which permits reproduction of each recording layer. The region information is set up by the manufacturer for every recording layer according to the destination of the contents information held at the data area of each recording layer.

In the example shown in FIG. 2, the contents information (contents A) of the same program is held at the data area of each recording layer. For example, contents A of a Hi-Vision version are held at HDDVD layer 12, and contents A of the normal version are held at DVD layer 14.

Figure 3:
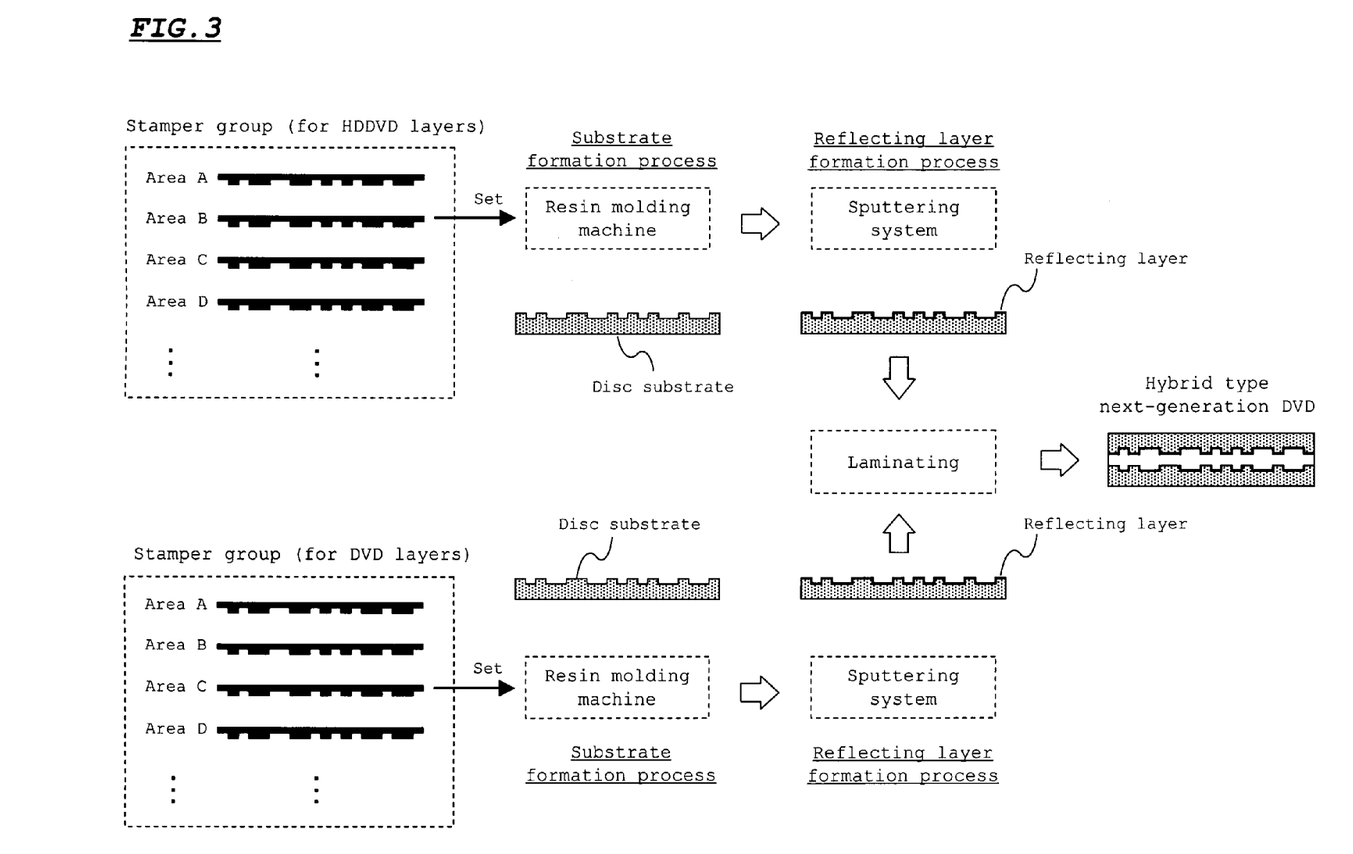
FIG. 3 shows a manufacturing process of the optical disc according to the embodiment of the present invention.

The manufacturing process (production line) of hybrid type next-generation DVD is shown in FIG. 3.

At the time of manufacture of hybrid type next-generation DVD, a stamper which has a region information according to the desired destination is first set to the resin molding machine for HDDVD, and the resin molding machine for DVD, respectively. According to this embodiment, the contents information (contents A) of the same program is held in each stamper. The region information of each stamper is different according to the destination of contents information. In the case of FIG. 3, the stamper in which area B is the destination is set to the resin molding machine for HDDVD, and the stamper in which area C is the destination is set to the resin molding machine for DVD.

Next, using each stamper, the disc substrate in which the information on the stamper is transferred is formed by the resin molding machine for HDDVD and the resin molding machine for DVD is formed, and then a reflecting layer is formed by sputtering on the transfer face of each substrate.

After that, each disc substrate is laminated as the reflecting layer side faces each other. And a printing layer is formed in the HDDVD-layer side disc surface. The disc information according to the destination of each recording layer is printed on the printing layer. Thereby, hybrid type next-generation DVD in which the destination of the contents information of the HDDVD layer and the DVD layer is destination B and destination C, respectively is manufactured.

When changing the destination of contents information, what is necessary is just to exchange the stamper to be set to a resin molding machine. For example, when changing into area A the destination of the contents information held at a HDDVD layer from area B, the stamper to be set to the resin molding machine for HDDVD is exchanged to the stamper in which area A is the destination. Thereby, the disc substrate in which the information on the stamper exchanged is transferred is formed by the resin molding machine for HDDVD. This disc substrate is laminated with the disc substrate (destination C) formed by the process for the DVD layer, after the reflecting layer is formed by spattering. Thereby, hybrid type next-generation DVD in which the destination of the contents information of the HDDVD layer and the DVD layer is destination A and destination C, respectively is manufactured.

Figure 4A:
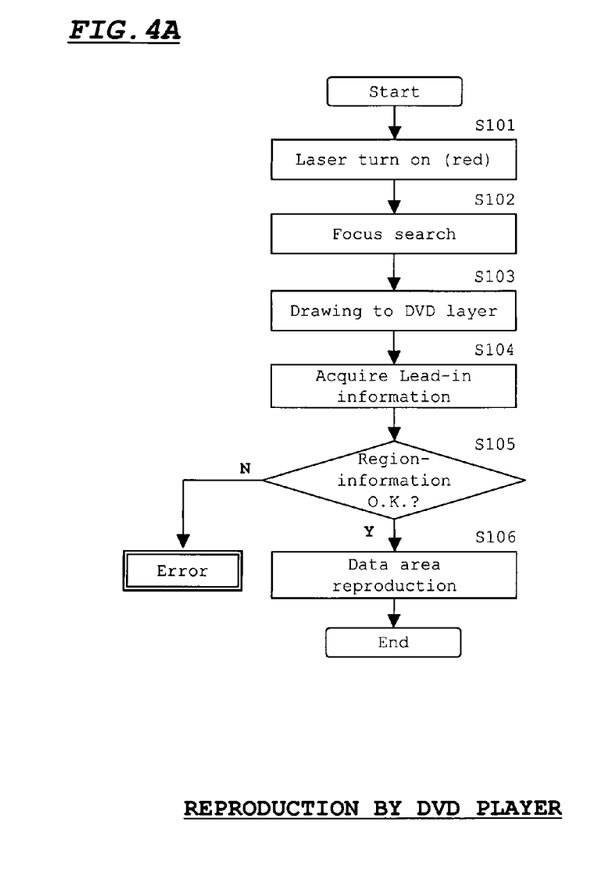
FIGS. 4A and B are process flowcharts in disc reproduction according to the embodiment of the present invention.
Figure 4B:
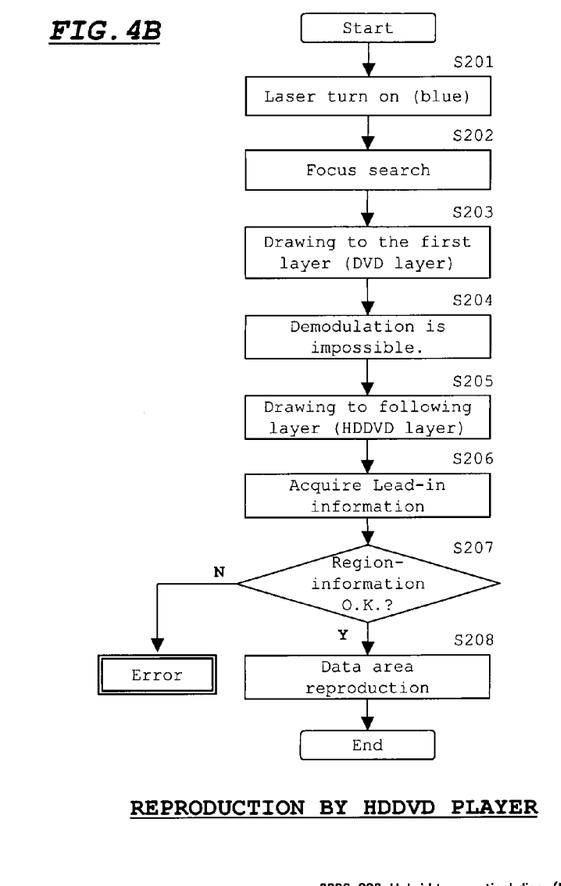
Figure 5:
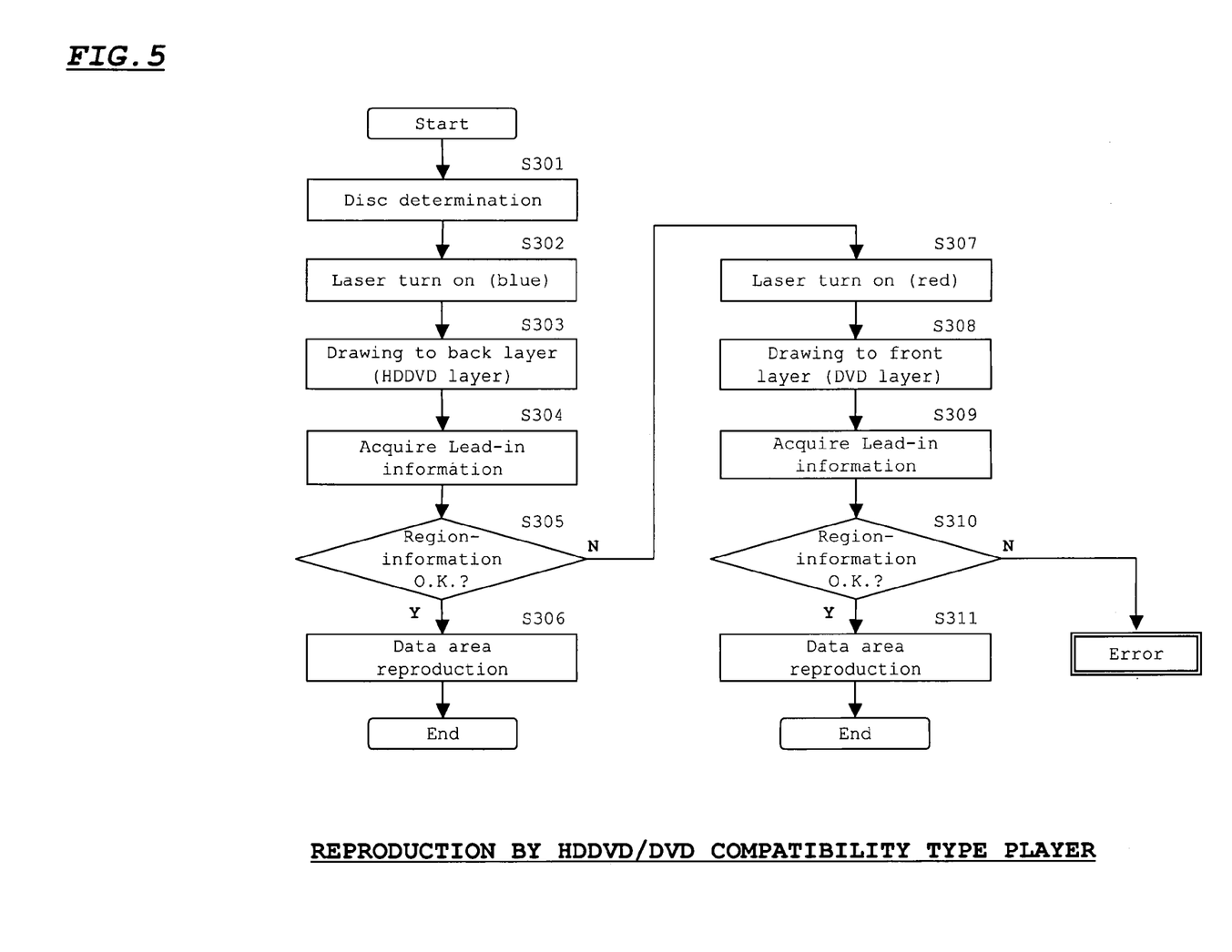
FIG. 5 is a process flowchart in disc reproduction according to the embodiment of the present invention.

FIGS. 4 and 5 are the reproduction process flow when loading hybrid type next-generation DVD manufactured like the above in the existing DVD player, the player only for next-generation DVD, and the DVD/next-generation DVD compatibile type player.

With reference to FIG. 4A, when hybrid type next-generation DVD manufactured like the above is loaded in the existing DVD player, the laser (red) in a player is turned on (S101), and the focus search to a recording layer is performed (S102). In this case, since HDDVD layer 12 of hybrid type next-generation DVD is not detected depending on a red laser beam, the disc loaded to the player is dealt with as a disc of a single recording layer. And the drawing operation to the first recording layer (DVD layer 14) is performed (S103), and the lead-in information is acquired (S104) The region information in the lead-in information is compared with the region code given to the player, and it is distinguished whether both consistent each other (S105). Here, if not consistent (S105: N), it is determined that the reproduction for the disc is failure (error). If consistent (S105: Y), the contents information held in the recording layer (DVD layer 14) is reproduced (S106).

With reference to FIG. 4B, when hybrid type next-generation DVD manufactured like the above is loaded in the player only for next-generation DVD, the laser (blue) in a player is turned on (S201), and the focus search to a recording layer is performed (S202). In this case, since each of HDDVD layers 12 and DVD layers 14 is detected by the blue laser beam, the disc loaded to the player is dealt with as a disc which has two recording layers.

After that, first, the drawing operation to the first recording layer (DVD layer 14) is performed (S203). However, since the first recording layer serves as a format according to a DVD standard, it is determined that the layer can not be demodulated (S204). Thus, it shifts to the drawing operation to the next recording layer (HDDVD layer 12) (S205). The lead-in information of HDDVD layer 12 is read after the drawing operation (S206), and the region information in it is compared with the region code given to the player (S207). Here, if both are not consistent (S207: N), it is determined that the reproduction for the disc is failure (error). If both are consistent (S207: Y), the contents information held in the recording layer (HDDVD layer 12) will be reproduced (S208).

With reference to FIG. 5, when hybrid type next-generation DVD manufactured like the above is loaded in the DVD/next-generation DVD compatibile type player, disc-determination processing is performed first (S301). For example, while the red laser beam and the blue laser beam are irradiated in order to the disc, it is examined whether the drawing and reading for each layer is possible. And the number of layers of the DVD layer and the HDDVD layer contained in the disc is detected from the examination result. Then the kind of the disc loaded to the player is determined based on the detection result.

When it is determined that the loaded disc is hybrid type next-generation DVD, while using the blue laser beam (S302), the drawing operation to the recording layer (HDDVD layer 12) on the far side from the laser beam entering side is performed first (S303) The lead-in information of HDDVD layer 12 is read after the drawing operation (S304), and the region information in it is compared with the region code given to the player (S305). Here, if both are consistent (S305: Y), the contents information held in the recording layer (HDDVD layer 12) is reproduced (S306).

On the other hand, if both are not consistent (S305: N), lighting laser is changed to red laser (S307), and the drawing operation to a front recording layer (DVD layer 14) is performed (S308). The lead-in information of DVD layer 12 is read after the drawing operation (S309), and the region information in it is compared with the region code given to the player (S310). Here, if both are consistent (S310: Y), the contents information held in the recording layer (DVD layer 12) is reproduced (S311). If both are not consistent (S310: N), it is determined that the reproduction for the disc is failure (error).

The embodiment according to the present invention is described above. However, the embodiment of the present invention is not limited to the above-mentioned one, and various changes are possible for it.

For example, although the above-mentioned embodiment shows the hybrid type disc which has one HDDVD layer and one DVD layer, the present invention is applicable to a hybrid type disc in which two or more recording layers, not restricted to a HDDVD layer and a DVD layer, corresponding to the laser beam of a different wavelength were arranged, and a manufacturing method for the same.

It should be noted that the number of layers of the recording layer corresponding to each wavelength is not restricted to one layer and two or more recording layers corresponding to each wavelength may be arranged. In this case, a region information is added for every contents information. For example, when two HDDVD layer and one DVD layers are arranged and one contents information is held through two HDDVD layers, only one region information is added to a DVD layer and a HDDVD layer, respectively. When two HDDVD layer and one DVD layers are arranged and one contents information is held in two HDDVD layers, respectively, a region information is added to the DVD layer, the first layer of the HDDVD layer, and the second layer of the HDDVD layer, respectively.

Further, although the region information is held in the lead-in area in the above-mentioned embodiment, for example, the region information maybe held in area other than the lead-in area, such as BCA (Burst Cutting Area) and a data area. The number of the area in which the region information is held does not need to be one, either, and the region information may be held in two or more parts among a lead-in area, BCA, a data area, etc.

Although the region information may be simple bit data, it may also be possible that the region information is dealt with as one of the cryptographic keys and the region information is used as one key at the time of encrypting data.

The region information may beheld in area which is different by the DVD layer and a HDDVD layer. For example, in the DVD layer, the region information may be added to the data created from the address data in a data area, and in the HDDVD layer, the region information may be taken in as one of the cryptographic keys used when encrypting data.

In taking in a region information as a cryptographic key for example, the method by which the sum of 10010000 (areas 1 and 4 are permitted) which shows the region code and the data of 00000001 is taken to generate 10010001 and generated data is written in a recording layer or the like may be used.

The present invention is applicable not only to the hybrid type disc which has a DVD layer and a HDDVD layer but the hybrid type disc of the combination of the recording layer according to other formats. For example, although the HDDVD layer is shown in the above-mentioned embodiment, the HDDVD layer may be replaced with a recording layer according to a Blu-Ray format to configure a hybrid type disc. This invention is applicable to the hybrid disc which holds a region information in two or more recording layers according to two or mote formats.

In addition, various change is possible for the embodiment of the present invention within the limits of the technical scope shown in the claim.

What is claimed is:

1. A hybrid type optical disc comprising:
    a first recording layer for having contents information in a format to be read with a first laser beam having a first wavelength, the first recording layer further having first region information specifying a first geographical area where the contents information of the first recording layer is intended to be played with an optical disc player having corresponding region information, the first region information being recorded and detected in the same manner as the contents information of the first recording layer; and
    a second recording layer for having contents information in a format to be read with a second laser beam having a second wavelength different from the first wavelength, the second recording layer further having second region information specifying a second geographical area, different from the first geographical area, where the contents information of the second recording layer is intended to be played with an optical disc player having corresponding region information, the second region information being recorded and detected in the same manner as the contents information of the second recording layer.

2. The hybrid type optical disc according to claim 1, wherein
    the contents information of the first recording layer and the contents information of the second recording layer are substantially the same as each other.

3. The hybrid type optical disc according to claim 1 or 2, wherein
    the first region information and the second region information are recorded on lead-in areas of the first recording layer and the second recording layer, respectively.

4. A hybrid type optical disc comprising:
    a next generation DVD layer for having contents information in a format to be read with a first laser beam having a first wavelength for a next generation DVD, the next generation DVD layer further having first region information specifying a first geographical area where the contents information of the next generation DVD layer is intended to be played with an optical disc player having corresponding region information, the first region information being recorded and detected in the same manner as the contents information of the next generation DVD layer; and
    a DVD layer for having contents information in a format to be read with a second laser beam having a second wavelength for a DVD, the DVD layer further having second region information specifying a second geographical area, different from the first geographical area, where the contents information of the DVD layer is intended to be played with an optical disc player having corresponding region information, the second region information being recorded and detected in the same manner as the contents information of the DVD layer.

5. The hybrid type optical disc according to claim 4, wherein
    the contents information of the next generation DVD layer and the contents information of the DVD layer are substantially the same as each other.

6. The hybrid type optical disc according to claim 4 or 5, wherein
    the first region information and the second region information are recorded on lead-in areas of the next generation DVD layer and the DVD layer, respectively.

7. A manufacturing method of a hybrid type optical disc, comprising the steps of:
    forming a first recording layer using a resin molding machine, and
    forming a second recording layer using a resin molding machine, wherein
    the first recording layer forming step includes performing a resin molding using a first stamper which holds contents information in a format to be read with a first laser beam having a first wavelength, the first stamper further holding first region information specifying a first geographical area where the contents information to be recorded on the first recording layer is intended to be played with an optical disc player having corresponding region information, the first region information being formed and detected in the same manner as the contents information on the first recording layer,
    the second recording layer forming step includes performing a resin molding using a second stamper which holds contents information in a format to be read with a second laser beam having a second wavelength different from the first wavelength, the second stamper further holding second region information specifying a second geographical area, different from the first geographical area, where the second contents information to be recorded on the second recording layer is intended to be played with players having corresponding region information, the second region information being formed and detected in the same manner as the second contents information on the second recording layer,
    the first stamper is chosen from a group of stampers each having region information different from each other according to geographical areas where the contents information of the first recording layer is intended to be played, and
    the second stamper is chosen from a group of stampers each having region information different from each other according to geographical areas where the contents information of the second recording layer is intended to be played.

8. A manufacturing method of a hybrid type optical disc according to claim 7, wherein the contents information of the first recording layer and the contents information of the second recording layer are substantially the same as each other.

9. A manufacturing method of a hybrid type optical disc according to claim 7 or 8, wherein
the first stamper and the second stamper hold the first region information and the second region information in lead-in areas, respectively.

10. A manufacturing method of a hybrid type optical disc, comprising the steps of:
forming a next generation DVD layer using a resin molding machine, and
forming a DVD layer using a resin molding machine, wherein
the next generation DVD layer forming step includes a step for performing a resin molding using a first stamper which holds contents information in a format to be read with a first laser beam having a first wavelength for a next generation DVD, the first stamper further holding first region information specifying a first geographical area where the contents information to be recorded on the next generation DVD layer is intended to be played with an optical disc player having corresponding region information, the first region information being formed and detected in the same manner as the contents information of the next generation DVD layer,
the DVD layer forming step includes a step for performing a resin molding using a second stamper which holds contents information in a format to be read with a second laser beam having a second wavelength for a DVD, the second stamper further holding second region information specifying a second geographical area, different from the first geographical area, where the contents information to be recorded on the DVD layer is intended to be played with an optical disc player having corresponding region information, the second region information being formed and detected in the same manner as the contents information of the DVD layer,
the first stamper is chosen from a group of stampers each having region information different from each other according to geographical areas where the contents information of the next generation DVD layer is intended to be played, and
the second stamper is chosen from a group of stampers each having region information different from each other according to geographical areas where the contents information of the DVD layer is intended to be played.

11. A manufacturing method of a hybrid type optical disc according to claim 10, wherein
the contents information to be recorded on the next generation DVD layer and the contents information to be recorded on the DVD layer are substantially the same as each other.

12. A manufacturing method of a hybrid type optical disc according to claim 10 or 11, wherein the first stamper and the second stamper hold the first region information and the second region information in lead-in areas, respectively.

13. A hybrid type optical disc comprising:
a first recording layer on which first contents information and first region information are recorded in a first format to be read with a first laser beam having a first wavelength, the first region information specifying a first geographical area where the first contents information is intended to be played with an optical disc player having corresponding region information; and
a second recording layer on which second contents information and second region information are recorded in a second format to be read with a second laser beam having a second wavelength different from the first wavelength, the second region information specifying a second geographical area, different from the first geographical area, where the second contents information is intended to be played with an optical disc player having corresponding region information, wherein.
the first contents information of the first recording layer and the second contents information of the second recording layer are substantially the same as each other.

14. The hybrid type optical disc according to claim 13, wherein
the first region information and the second region information are recorded on lead-in areas of the first recording layer and the second recording layer, respectively.

15. A hybrid type optical disc comprising:
a next generation DVD layer on which first contents information and first region information are recorded in a format to be read with a first laser beam having a first wavelength for a next generation DVD, the first region information specifying a first geographical area where the first contents information is intended to be played with an optical disc player having corresponding region information; and
a DVD layer on which second contents information and second region information are recorded in a format to be read with a second laser beam having a second wavelength for a DVD, the second region information specifying a second geographical area, different from the first geographical area, where the second contents information is intended to be played with an optical disc player having corresponding region information, wherein
the first contents information of the next generation DVD layer and the second contents information of the DVD layer are substantially the same as the each others.

16. The hybrid type optical disc according to claim 15, wherein
the first region information and the second region information are recorded on lead-in areas of the next generation DVD layer and the DVD layer, respectively.

* * * * *